April 14, 1970  D. J. ARNOLD ET AL  3,506,299
CAMPING VEHICLE BODY
Filed Aug. 10, 1967  4 Sheets-Sheet 1
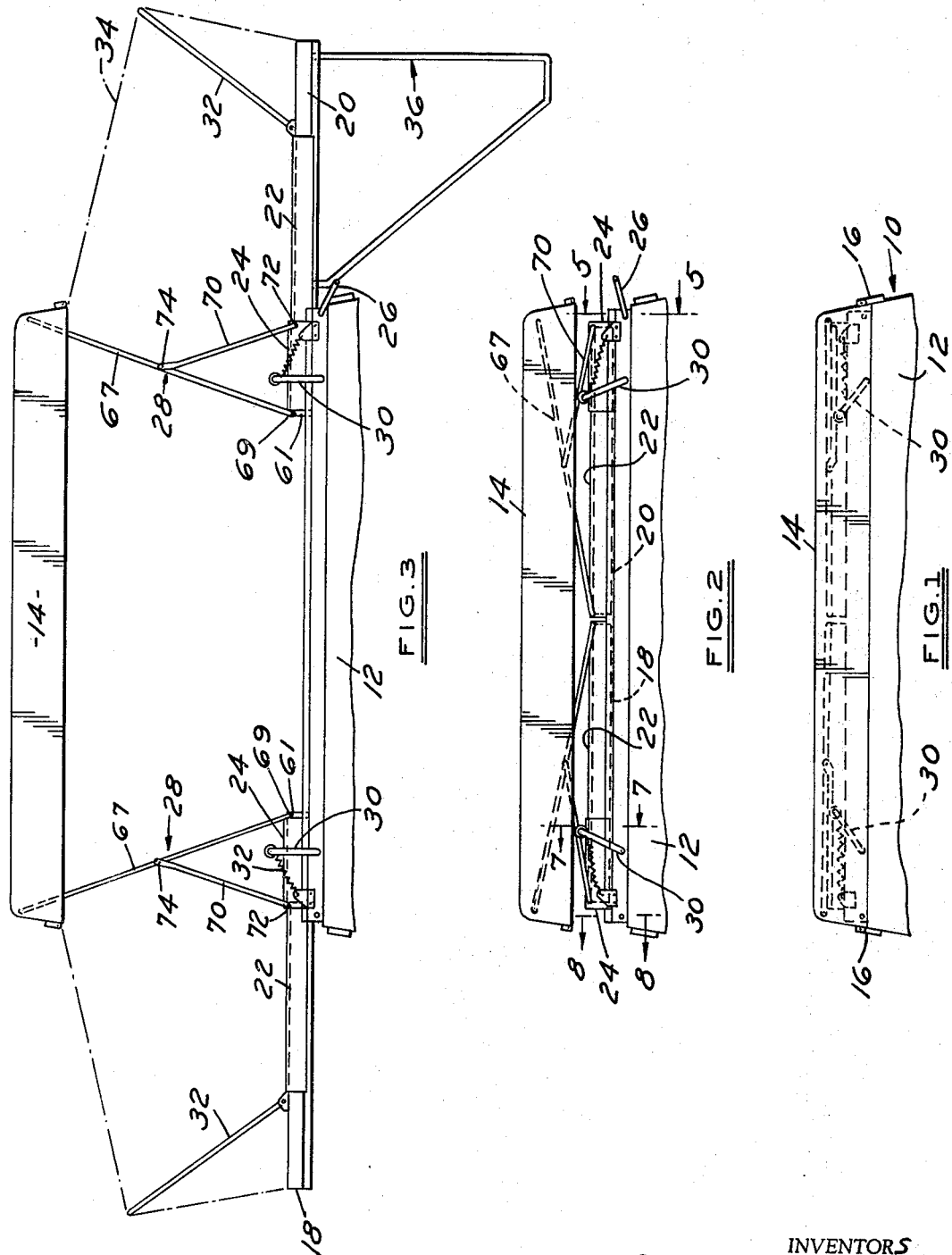
INVENTORS
DELEVAN J. ARNOLD
THOMAS H. WHITNEY
BY
Farley, Forster & Farley
ATTORNEYS

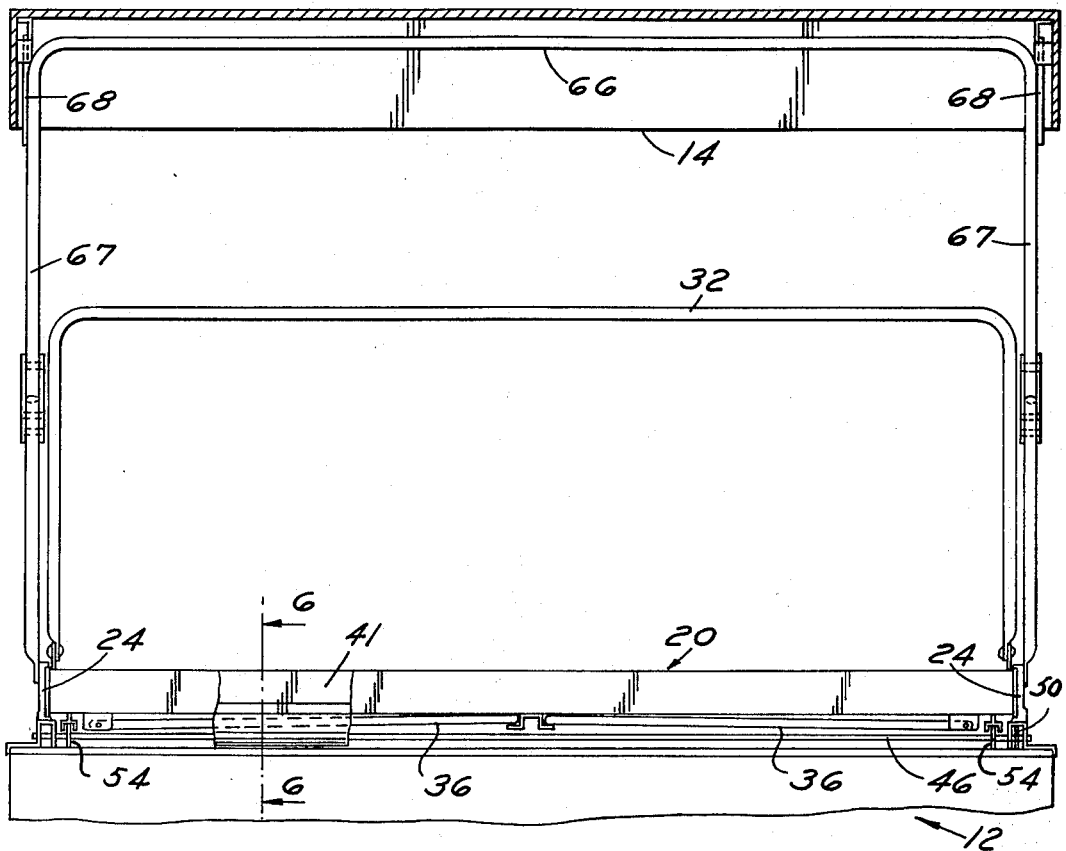
FIG. 4
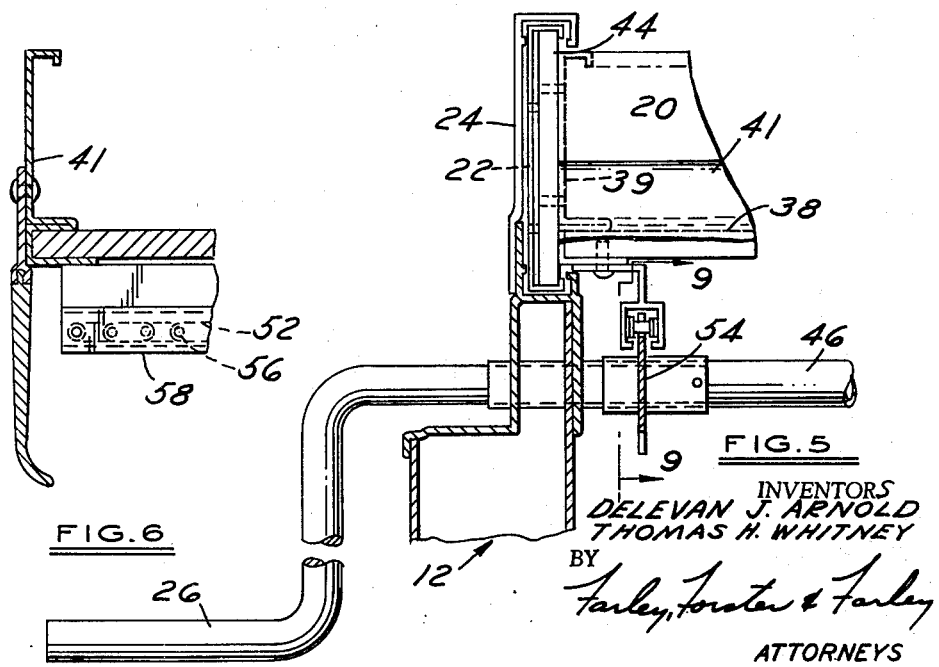
FIG. 6
FIG. 5
INVENTORS
DELEVAN J. ARNOLD
THOMAS H. WHITNEY
BY
Farley, Forster & Farley
ATTORNEYS April 14, 1970  D. J. ARNOLD ET AL  3,506,299
CAMPING VEHICLE BODY
Filed Aug. 10, 1967  4 Sheets-Sheet 3
FIG. 7
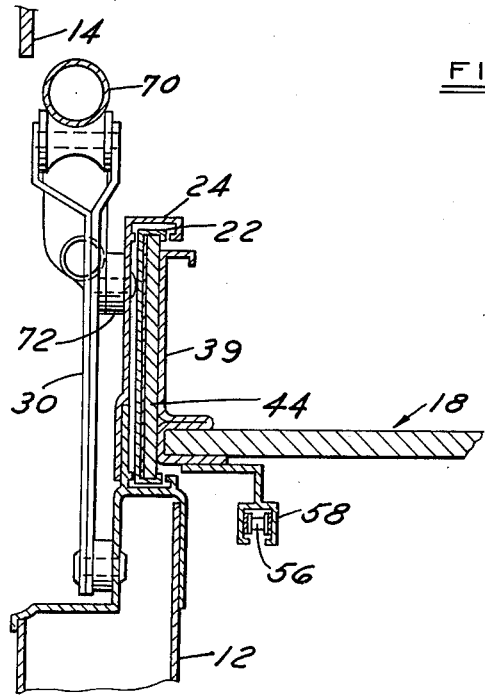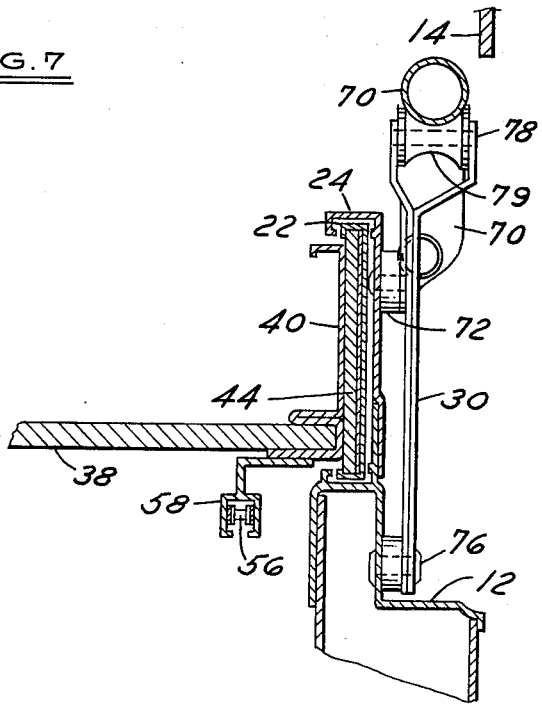
FIG. 8
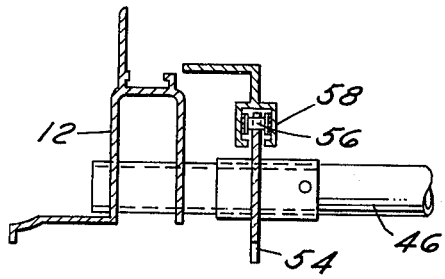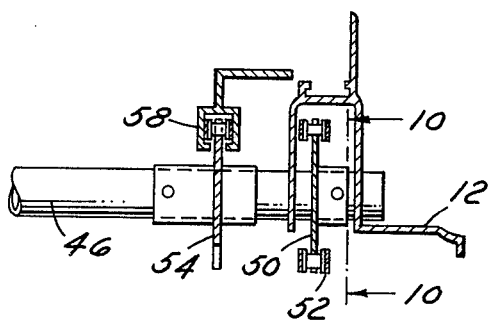
INVENTORS
DELEVAN J. ARNOLD
THOMAS H. WHITNEY
BY
Farley, Forster & Farley
ATTORNEYS April 14, 1970   D. J. ARNOLD ET AL   3,506,299
CAMPING VEHICLE BODY
Filed Aug. 10, 1967   4 Sheets-Sheet 4
FIG.9
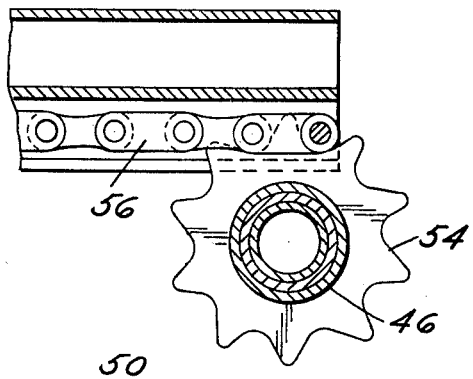
FIG.10
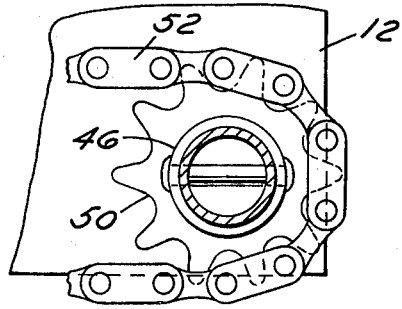
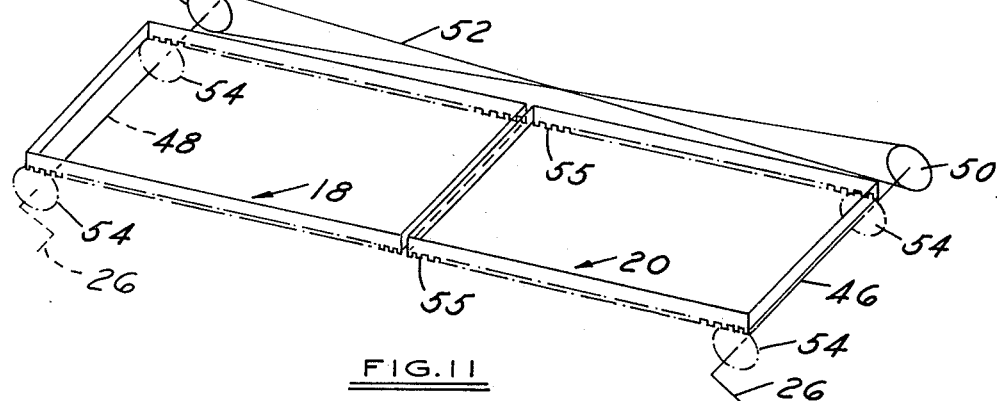
FIG.11
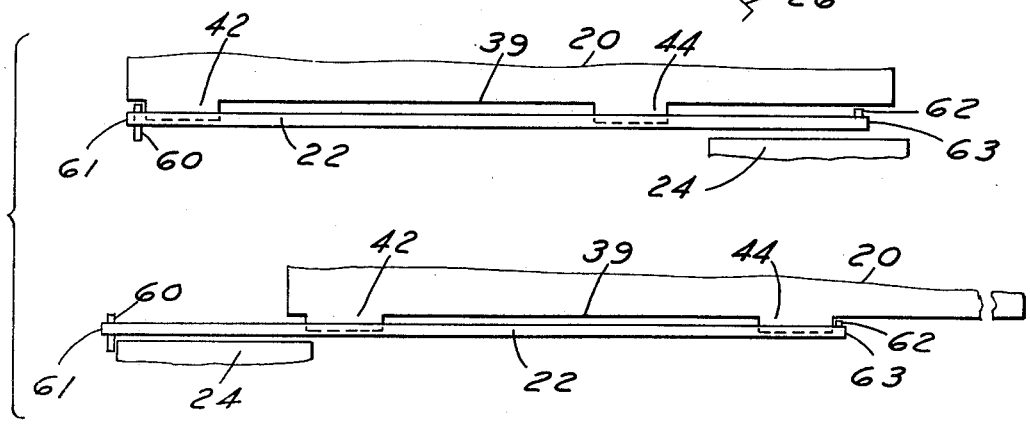
FIG.12
INVENTORS
DELEVAN J. ARNOLD
THOMAS H. WHITNEY
BY
Farley, Forster & Farley
ATTORNEYS

United States Patent Office 3,506,299
Patented Apr. 14, 1970

3,506,299
CAMPING VEHICLE BODY
Delevan J. Arnold, Columbiaville, and Thomas H.
Whitney, Attica, Mich., assignors to Vesely Company, a corporation of Michigan
Filed Aug. 10, 1967, Ser. No. 659,679
Int. Cl. B60p 3/32
U.S. Cl. 296—23         6 Claims

ABSTRACT OF THE DISCLOSURE

A camping vehicle body having top and bottom body portions and movable bed frames mounted on the bottom portion, wherein the body is convertible from a compact state in which the top forms a closure for the bottom body portion, to an expanded state in which the top forms a roof panel and the bed frames are extended from opposite sides of the body. Mechanism is provided for simultaneously and oppositely moving the bed frames and for transmitting this movement, through extension slides forming part of the bed frame mounting structure, to linkage which supports the top. When unlatched from the bottom, the top is initially raised by lifting arms to a clearance position relative to the bed frames to permit initial movement thereof.

BACKGROUND OF THE INVENTION

Field of the invention

This invention relates to an improved body construction for a camping vehicle convertible from a compact form for road use to an expanded form for living use.

Description of the prior art

Most camping vehicles, when converted to expanded form for living use, employ a fabric tent-like roof structure which is relatively difficult to erect. A fabric cover is generally placed over the body when the vehicle is in compact form for road use, which is relatively hard to install and difficult to properly seal. A few attempts have been previously made to provide a body construction incorporating top and bottom body portions, the top body portion serving as a cover or closure when the vehicle is in compact form, and as a roof panel when the vehicle is converted to expanded form, as shown in U.S. Patents 1,300,021 and 1,946,164. Such examples may be characterized by their complexity, making the task of converting the vehicle no more simple than with the tent form of construction.

No satisfactory construction is known incorporating the advantages of a permanent top cover and roof panel together with a simple and relatively inexpensive mechanism for converting the vehicle from compact to expanded state and visa versa.

SUMMARY OF THE INVENTION

The invention provides a vehicle body of the type which is convertible from a compact form for road use to an expanded form for living use in which a top body portion is releasably secured or latched to a lower body portion to form a body therefor in the compact form of the vehicle, with means for raising the top to a clearance position relative to the lower body portion when unlatched therefrom. A pair of bed frames are carried by the lower body portion and are simultaneously movable by actuating means oppositely to each other between stowed and extended positions with the initial extending movement being permitted by the clearance position of the top. A linkage operable in response to bed frame movement to extended position elevates the top to an upper level in which it serves as a roof panel.

The bed frames are each movably supported on the lower body portion by a pair of slides, slidably engaging the sides of the bed frame, and each slide in turn being slidably mounted in a fixed guide carried by the body structure. The actuating means imparts movement directly to the bed frames. This movement is, at least in part, transmitted to the slides as the bed frames are moved to extended position, the slides moving with the bed frames and forming extensions of the guides to provide added support for the bed frames in their extended position.

Preferably, the top linkage is connected to the bed frame slides, enabling raising and lowering movement to be imparted to the top body panel in response to extending and retracting movement of the bed slides; and, according to other preferred feature a lost motion driving connection is employed between the bed frames and bed slides, enabling the proper amount of movement to be imparted to the top for a desired amount of movement of the bed frames.

A preferred form of bed frame actuating mechanism is operable from one location on the vehicle.

Other features and advantages of the invention will appear from the description to follow of the representative embodiment disclosed in the accompanying drawings.

DESCRIPTION OF THE DRAWING

FIG. 1 is a schematic side elevation of the upper portion of the vehicle body in compact state, a top body portion forming a closure for a lower body portion;

FIG. 2 is a side elevation similar to FIG. 1 showing the top body portion released from the lower body portion and in an initial raised position;

FIG. 3 is a side elevation similar to FIG. 1 showing the top body portion and bed frame in expanded position, the top forming a roof panel;

FIG. 4 is an end elevation partly in section showing the construction in the expanded state of FIG. 3;

FIG. 5 is an enlarged sectional detail taken as indicated by the line 5—5 of FIG. 2 and showing the mounting of one side of the bed frame in a slide and fixed guide, together with actuating means for imparting movement to the bed frame;

FIG. 6 is an enlarged sectional detail taken as indicated by the line 6—6 of FIG. 4, showing the construction of the outer end of a bed frame;

FIG. 7 is an enlarged transverse sectional elevation taken as indicated by the line 7—7 of FIG. 2 showing the bed frame mounting and lifting arms for initially raising the top;

FIG. 8 is an enlarged transverse sectional detail taken as indicated by the line 8—8 of FIG. 2 and showing the actuating means for moving one of the bed frames;

FIG. 9 is a sectional elevation taken as indicated by the line 9—9 of FIG. 5 showing the rack and pinion driving arrangement for a bed frame;

FIG. 10 is a sectional elevation taken as indicated by the line 10—10 of FIG. 8;

FIG. 11 is a schematic, perspective view of the complete bed frame actuating mechanism; and FIG. 12 is a schematic plan view showing the operation of the motion transmitting means between a bed frame and a supporting slide.

DESCRIPTION OF THE PREFERRED EMBODIMENT

Referring to FIGS. 1–3, the vehicle body 10 includes a bottom portion 12 and a top 14 which, in the compact state of the body shown in FIG. 1, is secured to the bottom 12 by suitable latches 16 and forms a cover therefor. A pair of bed frames 18 and 20 are carried on the upper part of the body portion 12, each bed frame being mounted between a pair of slides 22 with each slide 22 slidably engaging a fixed guide 24. The bed frames 18 and 20 are movable from the stowed position shown in FIGS. 1 and 2 to the extended position shown in FIG. 3 by actuating mechanism to be described, operated by a detachable crank 26. The top 14 is supported by linkage 28 operable to elevate the top from the raised position of FIG. 2 to the roof panel level shown in FIG. 3 in response to movement of the bed frames 18 and 20 to the extended position. When the latches 16 are released, pairs of lifting arms 30 pivoted to the structure of the body portion 12 and normally urged to a raised position by springs 32, act on the linkage 28 to raise the top 14 from the closed position of FIG. 1 to the clearance position shown in FIG. 2, this movement taking place in response to the relase of the latches 16. Each bed frame 18 and 20 also carries a bow 32 for supporting a flexible top panel 34, and a pair of folding, adjustable length supporting legs 36.

Further details will now be given, beginning with the construction and mounting of the bed frames 18 and 20, with reference to FIGS. 4–7, 11 and 12. Each bed frame is a shallow, rectangular box for receiving a mattress, having a floor 38, side rails 39 and 40 and an end member 41 (FIG. 6). A pair of pads 42 and 44, schematically illustrated in FIG. 12, are secured to each of the side rails 39 and 40 of the bed frame as shown in FIGS. 5 and 7, and each pair of pads 42 and 44 is slidably engaged by one of the C-section slides 22 which in turn is slidably mounted in one of the C-section fixed guides 24. The slides 22 have a length almost equal to that of the bed frame side rails 39 and 40.

The actuating means for moving the bed frames, operated by the crank 26, and schematically illustrated in FIG. 11, includes a shaft 46 mounted on the body portion 12 adjacent one end thereof, a second shaft 48 mounted at the other end of the body portion 12, with driving means in the form of a sprocket 50 secured to each of the shafts engaged by a crossed sprocket chain 52 so that rotation of either of the shafts 46 and 48 produces opposite rotation of the other shaft. A pair of sprockets or pinions 54 are secured to each of the shafts 46 and 48, each pair of pinions engaging a pair of racks 55 secured to each one of the bed frames 18 and 20. Each rack is formed by a length of sprocket chain 56 mounted in a channel section track member 58 fastened to the underside of each bed frame. Thus, this actuating mechanism simultaneously moves the bed frames oppositely to each other between stowed and extended positions.

Movement of the bed frames is imparted to the slides 22 through a lost motion arrangement best illustrated in FIG. 12. Each slide 22 carries a transverse pin 60 near the inner end 61 of the slide, the pin extending toward the adjacent side rail 39 or 40 of the bed frame into overlapping relation with the side rail mounting pad 42 and extending oppositely into overlapping relation with the fixed guide 24. Another pin 62 is mounted on each of the slides 22 adjacent the outer end 63 thereof, this pin 62 extending toward the adjacent side rail into overlapping relation with the second side rail mounting pad 44. When the bed frames are moved from the stowed to extended position, the bed frame mounting pads 44 will abut against the stop pins 62 on the slides causing the slides to thereafter move with the bed frames until further slide motion is arrested by abutment of the inner stop pins 60 against the fixed guides 24. During opposite movement of the bed frames toward stowed position, the bed frame mounting pads 42 abut the inner stop pins 60 of the slide 22 and return the slides to stowed position.

The linkage 28, best shown in FIGS. 1–4, consists of two top bows 66 each in effect forming a pair of link members 67 which are pivotally connected by brackets 68 (FIG. 4) to opposite sides of the top 14 adjacent one end thereof and by pivot pins 69 to one pair of slides 22 adjacent to the inner ends 61 thereof. Hence, a pair of slides 22 and fixed guides 24 serve as mounting structure for securing a pair of link members 67 to the lower body portion 12 for movement with one of the bed frames. A reaction link member 70 is attached to each of the fixed guides 24 by a pivotal connection 72 and to one of the link members 67 by a pivotal connection 74.

Each of the lifting arms 30 is mounted on a pivot pin 76 secured to the lower body portion 12 as shown in FIG. 7 and is formed with a forked free end 78 equipped with a roller 79 which engages one of the reaction links 70.

When the top latches 16 are released, the lifting arms 30, urged by the springs 32, are self-operating and act against the reaction links 70 to raise the top 14 to a clearance position relative to the lower body portion 12 and bed frames 18 and 20, also placing the linkage 28 in an operative angular position for transmitting extending bed frame movement into elevating motion of the top 14. Initial extending movement of the bed frames is not accompanied by any movement of the top, but is permitted by the clearance position thereof, this initial movement continuing through the lost motion provided by the spacing between the stop pins 62 on the slides 22 and the mounting pads 44 on the bed frame side rails 39. This lost motion enables bed frame and top movement to be proportioned so that the top is elevated to the desired roof level and the bed frames moved to a desired degree of extension.

When the bed frames are in their extended position, the slides 22 form extensions of the guides 24 for bed frame support; also, the slides 22 are positioned so that the top link pivots 69 are next to the fixed guides 24 and stabilized thereby.

Naturally modifications of the disclosed construction will have to be made in adapting the invention to various sizes and configurations of vehicle bodies. Such modifications, and others within the scope of the following claims, are to be considered a part of the present invention.

We claim:

1. In a vehicle body of the type which is convertible from a compact form for road use to an expanded form for living use, having a lower body portion, bed members carried thereby and movable from a stowed position within the sides of the body to an extended position projecting from opposite sides of the body, a movable top body portion forming a cover for the lower body portion in the compact form and a roof panel in the expanded form, and latch means releasably securing the top body portion to the lower body portion, the improvement wherein:

each bed member is supported for movement on the lower body portion by a pair of slide members and guides, each guide being fixed to the structure of the lower body portion, and each slide member slidably engaging a guide and one side of a bed member;

link means comprising link members pivotally connecting to the top body portion adjacent the corners thereof and to one of the bed members and slide members, and reaction links, each reaction being pivotally connected to the structure of the lower body portion and to one of the link members;

and means carried by the lower body portion operable for raising the top body portion to a clearance position relative to the lower body portion when the latch means are released and for moving the bed members relative to the slide members and the slide members relative to the lower body portion between said stowed and extended positions with extending movement imparting upward movement to the top through the link means.

2. A vehicle body as claimed in claim 1 wherein said means carried by the lower body portion includes a plurality of arms, each arm having one end pivotally secured to fixed structure on the lower body portion, a free end engageable with said link means, and a spring normally urging each arm to a raised position relative to the lower body portion.

3. A vehicle body as claimed in claim 1 wherein said means carried by the lower body portion includes motion transmiting means operable to transmit movement between the bed members and the slide members following an initial increment of movement of one of said members from stowed to extended position.

4. A vehicle body as claimed in claim 3 wherein the motion transmitting means comprises abutting means engageable following an initial increment of movement of the bed members from stowed to extended position.

5. A vehicle body as claimed in claim 1 wherein the link members are connected to the slide members.

6. A vehicle body as claimed in claim 1 wherein the actuating means includes a pair of shafts carried by the lower body portion, means for rotating one of the shafts, driving means connecting one shaft with the other shaft for producing opposite rotation thereof, pinion means carried by each shaft, and rack means carried by at least one of the bed members and slide members for engagement with the pinion means.

References Cited

UNITED STATES PATENTS

| | | | |
|---|---|---|---|
| 3,397,007 | 8/1968 | Scheid | 296—27 |
| 3,288,520 | 11/1966 | Krutzikowsky | 296—23 |
| 2,306,084 | 12/1942 | Rollo | 296—23.3 |

PHILIP GOODMAN, Primary Examiner

U.S. Cl. X.R.

52—66